April 8, 1969 U. VÖLKER ET AL 3,437,458

SINTERED FRICTION MATERIAL

Filed April 28, 1967

LOAD PER UNIT AREA IN Kp/cm$^2$

SLIDING VELOCITY IN METERS/SECOND

| MATERIAL | 1 | 2 | 3 | 4 |
|---|---|---|---|---|
| WEAR IN mm. | 0.11 | 0.10 | 0.11 | 0.28 |

TEMPERATURE OF FRICTION SURFACE IN °C

INVENTORS
Ulrich Voelker &
Guenter Gerloff

BY *[signature]*

ATTORNEY

United States Patent Office 3,437,458
Patented Apr. 8, 1969

3,437,458
SINTERED FRICTION MATERIAL
Ulrich Völker and Günter Gerloff, Reinbek, Germany, assignors to Jurid Werke G.m.b.H.
Filed Apr. 28, 1967, Ser. No. 634,682
Claims priority, application Germany, Apr. 30, 1966, J 30,722
Int. Cl. B22f 3/10
U.S. Cl. 29—182.5                    3 Claims

ABSTRACT OF THE DISCLOSURE

A sintered material suited for use as a frictional surface, consisting of 10–15% by wt. graphite, 1.5 to 3.5% by wt. of Periodic Table group $V_b$ metals and the remainder iron.

FIELD OF THE INVENTION

The invention relates to a sintered iron-based friction material containing graphite and at least one element of the fifth main group of the periodic system.

DESCRIPTION OF THE PRIOR ART

In comparison with friction materials produced with organic, resinous binding agents, sintered friction materials have the primary advantage of being able to withstand considerably higher thermal stresses.

They are produced from an intimate mixture of powdered metals and nonmetals by pressing and sintering.

These friction materials usually consist of sintered lead bronzes with additions of dry lubricants and so-called friction reinforcers. Graphite and molybdenum sulphide for example are suitable as dry lubricants; on the other hand, ceramic additives and minerals such as quartz and corundum may be used to increase the coefficient of friction. By appropriate variation in the additives it is possible to make adaptations for all applications, particularly as regards the coefficient of friction.

Because of the relatively high cost of the raw materials, attempts have long been made to change over from the bronze friction materials to those containing mainly iron.

It is known to add mainly graphite to sintered iron-based friction materials. Other known additives are: lead, copper and its alloys with tin and zinc, as well as mineral components with aluminum oxides and silicic acid, for example mullite. Particularly disturbing with these materials is their tendency to spark when running dry.

In the U.S. Patent No. 2,863,211 issued on Dec. 9, 1958, to S. K. Wellman for a "Friction Assembly," through which a friction material is known which is to comprise not only iron but also a high proportion of graphite of from 15 to 60 percent by weight, the essential properties to be required of such friction materials are given as:

(1) a high coefficient of friction
(2) a high resistance to wear
(3) constancy in the coefficient of friction
(4) silent, smooth and uniform operation of the structural parts equipped with the friction material
(5) cheap production.

The high proportion of graphite is intended to serve primarily to avoid seizing or counter-attack in conjunction with the counter friction surface, which generally consists of cast iron, malleable cast iron or hardened or unhardened engineering steel. The prior art indicates the graphite below 15% is not used because in the known combinations very unfavourable wear is experienced. The difficulty with iron containing a high proportion of graphite consists, however, in producing friction linings with sufficient internal strength.

In another iron-based friction material of abandoned U.S. application Ser. No. 684,954, filed Sept. 19, 1957, and mentioned in U.S. Patent No. 2,945,759, an attempt has therefore been made, firstly to limit the proportion of graphite to from 20 to 32 percent by weight, secondly to use a mixture of powdered and flaky graphite, and thirdly to add from 3 to 10% by weight of components having a binding action such as copper, lead, bismuth or cadmium. By this means, it was intended to obtain the above-mentioned properties with adequate internal strength. Friction linings from such a mixture of powders, however tend towards a noisy mode of operation if the proportion of graphite is less than 25%.

In these materials, the tendency towards noisiness has been found being associated with a great difference between adhesive friction and sliding friction, a phenomenon known to those skilled in the art, as "stick-slip." In addition, the wear is always relatively high because the internal shearing strength of the material is low as a result of the graphite additions required.

The relatively high proportion of binding metals, particularly easily melting ones such as cadmium, bismuth and lead, does not keep its uniform distribution in the friction material. On the contrary, a high percentage migrates to the outside under the influence of heat generated during the action of friction, and causes additional lubrication at the friction surface.

This phenomenon may be desirable in some circumstances because an attack of the counter surface is avoided in this manner, and additional kinetic energy is absorbed as melting heat. On the other hand, the emergence of molten metal at the friction surface leads to a reduction in the coefficient of friction in service and hence to a further unfavourable increase in the difference between adhesive or static and sliding friction.

OBJECTS OF THE INVENTION

Objects of the invention are: to provide an iron-based friction material, thereby providing a low-cost product; to provide a friction material that does not tend to spark when running dry; to provide an iron-graphite friction material having a low wear and a requisite internal strength, patricularly shear strength, for use as friction linings; to provide an iron-graphite-binder friction material having the characteristic of noiseless operation; and to provide a friction material developing substantially uniform curves for the coefficient of friction and for the difference between the static and the sliding coefficient of friction over its life and during use.

SUMMARY OF THE INVENTION

It has now been found that the objects of the invention are attained by using an iron-based friction material in a composition characterized by an admixture of at least 10 and at most 15 percent by weight of graphite and at least 1.5 and all together at most 3.5 percent by weight of one or more metals selected from the fifth main group of the periodic system, arsenic, antimony or bismuth. If two or all three of these metals are added in an alloy, the proportion of bismuth preferably amounts to at least 50 percent of their total weight.

A main advantage of this novel friction material is a uniformly gentle, noiseless frictional action even when running dry. A further favourable property is a satisfactory internal strength of the material and in consequence of long life for the friction linings produced therefrom.

A friction material according to the invention, and substantially composed of only three components is easy to process and, further to this, has a satisfactory deformability. It was found that such friction lining which had been sintered on a support may be fitted without difficulties to a brake shoe having a radius of 150 mm.

Other objects and many of the attendant advantages of this invention will be readily appreciated as the same becomes better understood by reference to the following detailed description when considered in connection with the accompanying drawings in which like reference numerals designate like substances throughout the figures thereof.

Figure 1:
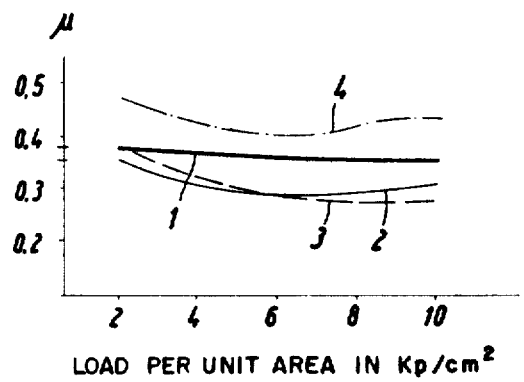
FIGURE 1 is a graph of the coefficient of friction versus load per unit area.

The only table of the drawing gives wear data.

DESCRIPTION OF THE PREFERRED EMBODIMENTS

A friction material 1 produced with the proportions by weight of

| | Percent |
|---|---|
| C | 14.5 |
| Bi | 3.3 |
| Fe (remainder) | 82.2 | displayed particularly favourable properties, and above all a uniformly high coefficient of friction.

The powder mixture in the composition according to the invention consists of powdered iron with a grain size of less than 0.1 mm. mesh size
powdered graphite with a grain size less than 0.3 mm. mesh size and
powdered bismuth with a grain size of less than 0.06 mm. mesh size.

This granular material was thoroughly mixed until a uniform distribution of the components was obtained.

The resulting mixture was compacted at a pressure of 4 mp./cm.$^2$ and then sintered at a temperature of 960 to 980° C. The sintering operation was carried out in a non-oxidizing atmosphere. The resulting friction material had a Brinell hardness of 18 to 25 kp./mm.$^2$.

The sintering temperature as mentioned, is between 960 and 980° C. The temperature is independent of the proportions of the specific materials chosen for the inventive friction material. The variation which is possible according to these values, is due to the control system of the oven. The compacting pressure affects the form and density of the material. This pressure varies in dependence of the graphitic component from 3 to 4 mp./cm.$^2$ the larger presure going with the higher graphitic component.

Similar good results are obtainable when using arsenic and/or antimony instead of bismuth, or the latter together with arsenic and/or antimony, in the limits given above. The friction materials according to the present invention show a specific balance of favourable characteristics not to be found in prior art materials. In this respect reference is made to the graphs and to the table shown in the drawing, and which can be interpreted as examples for the differences existing in favour to the inventive material, as compared to the known art.

In the drawing, the coefficient of friction $\mu$ of the friction material 1 of the invention is illustrated in graphic form in its functional relationship to the contact load per unit area, the rubbing speed and the temperature of the friction surfaces. Wear is indicated in the accompanying table. The test bed on which the measurements were made was built up in such a manner that two specimens were pressed by means of a caliper-like device against the opposite faces of a rotating disc with a diameter of about 400 mm. The disc is brought to the predetermined speed by means of an electrical drive; then the lining specimens disposed one at each side of the disc are pressed against the disc hydraulically. The hydraulically actuated, caliper-like device is supported on a pressure gauge through a lever.

The disc, as counter material in the friction couple, consisted of steel with a low phosphorus and sulphur content having 0.6% C, 0.25% Si, 0.25% Mn and at most 0.35% each of P and S, classified as steel CK 60 by VDEH (Verein Deutscher Eisenhuettenleute, Association of German Iron Producers).

Figure 2:
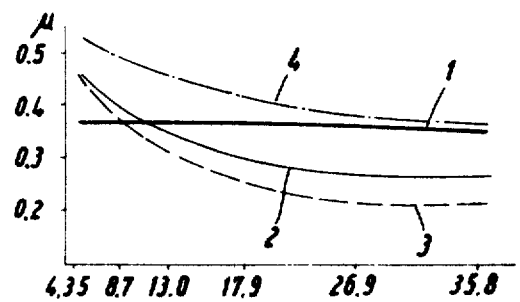
FIGURE 2 is a graph of coefficient of friction versus sliding velocity.
Figure 3:
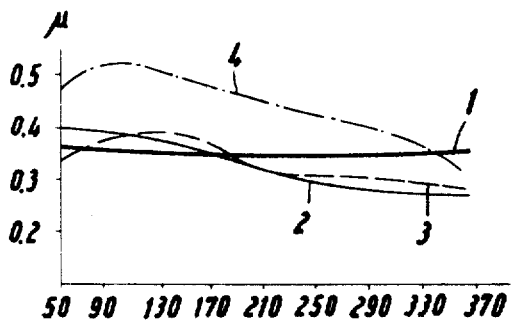
FIGURE 3 is a graph of coefficient of friction versus temperature of friction surface.

The scatter of the experimental points used for drawing the curves, was ±8%. All graphs refer to sliding friction in dependence of a variable parameter belonging to a group of three parameters of which in each case the two others are kept constant or substantially constant. The respective values are:

in FIG. 1 sliding velocity $v=13$ m./sec.=constant temperature $t \leq 100°$ C.

in FIG. 2 load $p=6$ kp./cm.$^2$=constant temperature $t \leq 100°$ C.

in FIG. 3 $p$, $v$=constant as in FIGS. 2 and 1, respectively.

The friction material of the invention in accordance with the above example with a composition of 14.5% by weight C, 3.3% by weight Bi, remainer Fe, whose curves of coefficient of friction are designated by 1 in the drawings, was compared with known friction materials, the measurement results designated by 2 and 3 relating to friction materials in accordance with the United States patent application Ser. No. 684,954, filed Sept. 19, 1957, now abandoned but mention in U.S. Patent No. 2,945,759, and the curves designated by 4 relating to a friction material in accordance with U.S. Patent No. 2,863,211. These reference friction materials were composed as follows:

Sample 2

| | Percent by weight |
|---|---|
| C | 22.0 |
| Bi | 4.5 |
| Fe | Remainder |

Sample 3

| | |
|---|---|
| C | 29.5 |
| Bi | 4.0 |
| Fe | Remainder |

Sample 4

| | |
|---|---|
| C | 30 |
| Fe | 70 |

It can clearly be seen from the course of the curves 2 and 3 that the coefficient of friction drops sharply as the graphite component is increased and, in particular, as the rubbing speed increases. This phenomenon, which is called "speed fading," is particularly noticeable with the sample designated by 4. When such friction materials are used in brakes, a rise in the coefficient of the friction as speed decreases means a highly undesirable increase in the risk of locking.

All three known reference friction materials (samples 2, 3 and 4) further display a decrease in the coefficient of friction with temperature, the dreaded "heat-fading," which is particularly marked in case of 4.

From the temperature curve and from the rubbing speed curve of samples 2 and 3, it is further possible to observe the results of the above-mentioned phenomena of metal- "exudation" and "stick-slip." The friction material of sample 4 had the high wear to be expected as a result of the high proportion of graphite.

The comparison materials, samples 2 and 3, had to be pressed at 5.5 mp./cm.$^2$ and sintered at 1050° C. in order to obtain their best frictional properties. Best properties in sample 4 were obtained by prepressing at 1.75 mp./cm.$^2$ and sintering at 18 kp./cm$^2$ and 990° C., that is to say in a furnace for sintering under pressure.

The figures show that the example 1 of the invention has rather ideal characteristics for use as a brake lining. Thus, its coefficient of friction has a total variation which is practically negligible in comparison to the variations met in the coefficients of friction of samples 2, 3 and 4 under equal test conditions.

A friction material in the composition according to the invention is cheaper to produce. Namely, it is producible at lower mold pressure and, without the need of sintering under pressure, at lower sintering temperatures. It has a surprisingly uniform curve of coefficient of friction in comparison with the known sintered iron friction materials.

It should be understood, that the foregoing disclosure relates to only preferred embodiments of the invention and that it is intended to cover all changes and modifications of the examples of the invention herein chosen for the purpose of the disclosure, which do not constitute departures from the spirit and scope of the invention set forth in the appended claims.

We claim:

1. A sintered friction material, consisting of: graphite in an amount of at least 10 and at most 15% by weight; at least one element selected from the group consisting of arsenic, antimony and bismuth, in a total amount of about 1.5 to 3.5% by weight; and iron forming substantially the remainder.

2. A sintered friction material as claimed in claim 1, bismuth forming at least about 50% by weight of the elements included from said group.

3. A sintered friction material as claimed in claim 2, consisting of about 14.5% graphite, 3.3% bismuth and 82.2% iron, all percentages being by weight.

References Cited

UNITED STATES PATENTS

| | | | |
|---|---|---|---|
| 2,863,211 | 12/1958 | Wellman | 29—182.3 |
| 2,945,292 | 7/1960 | Luther | 29—182.3 |
| 2,974,039 | 3/1961 | Deventer | 29—182.5 |
| 3,067,493 | 12/1962 | Sampson | 29—182.5 |

CARL D. QUARFORTH, *Primary Examiner.*

A. J. STEINER, *Assistant Examiner.*

U.S. Cl. X.R.

29—182.3